United States Patent [19]

Burns et al.

[11] Patent Number: 4,761,049
[45] Date of Patent: Aug. 2, 1988

[54] OPTICAL WAVEGUIDE DEVICE FOR FREQUENCY SHIFTING AND MODE CONVERSION

[75] Inventors: William K. Burns, Alexandria; Nicholas J. Frigo, Arlington, both of Va.; Robert P. Moeller, Fort Washington, Md.

[73] Assignee: The United States of America as represented by the Secretary of the Navy, Washington, D.C.

[21] Appl. No.: 913,430

[22] Filed: Sep. 30, 1986

[51] Int. Cl.[4] .................... G02B 6/10; G02B 5/30
[52] U.S. Cl. .................... 350/96.14; 350/96.11; 350/96.12; 350/96.13; 350/374; 350/400
[58] Field of Search .............. 350/96.11, 96.12, 96.13, 350/96.14, 96.15, 355, 356, 358, 374, 400, 96.29, 96.30

[56] References Cited

U.S. PATENT DOCUMENTS

| | | | |
|---|---|---|---|
| 4,291,393 | 9/1981 | Giallorenzi et al. | 350/96.14 |
| 4,381,139 | 4/1983 | Alferness | 350/96.14 |
| 4,384,760 | 5/1983 | Alferness | 350/96.14 |
| 4,390,236 | 6/1983 | Alferness | 350/96.14 |
| 4,448,479 | 5/1984 | Alferness | 350/96.14 |
| 4,533,207 | 8/1985 | Alferness | 350/96.14 |
| 4,666,255 | 5/1987 | Taylor et al. | 350/96.30 X |
| 4,691,984 | 9/1987 | Thaniyavarn | 350/96.14 |
| 4,714,311 | 12/1987 | Auracher | 350/96.11 |
| 4,729,620 | 3/1980 | Pavlath | 350/96.15 |
| 4,729,622 | 3/1988 | Pavlath | 350/96.15 |
| 4,732,444 | 3/1988 | Papuchon et al. | 350/96.14 |
| 4,732,445 | 3/1988 | Sabatier et al. | 350/96.14 |
| 4,735,485 | 4/1988 | Shaw et al. | 350/96.13 X |

OTHER PUBLICATIONS

Schmidt et al., "Efficient Optical Waveguide Switch/Amplitude Modulator", Optics Lett., vol. 2, No. 2, 2/78, pp. 45–47.
Kingston et al., Broadband Guided-Wave Optical Frequency Translator Using an Electroptical Bragg Array, Appl. Phys. Lett., 42(9), May 1, 1983, pp. 759–761.
Heismann et al., Integrated-Optical Single-Sideband Modulator and Phase Shifter, IEEE J. of Quantum Electronics, vol. QE-18, No. 4, Apr. 1982, pp. 767–771.
Burns et al., Broadband $LiTaO_3$ Guided-Wave Mode Convertor/Frequency Shifter, IOOC-EOOC "85, 5th Intern. Conf. on Integrated Optics and Optical Fibre Communication and 11th European Conference on Optical Communication", Technical Digest, 851-4, vol. 1, 1985, Oct. 1–4, 1985, Venice, Italy, Publ. Institute' Int. Communicazione Genova, Italy, 3 vol.

Primary Examiner—William L. Sikes
Assistant Examiner—Brian M. Healy
Attorney, Agent, or Firm—Thomas E. McDonnell; Andrew M. Lesniak

[57] ABSTRACT

Successive waveguide regions in a birefringent waveguide host electric fields oriented transverse to any optical wave propagated through the waveguide. A scheme of cascaded electrodes biased by voltage(s) applied to the electrodes dictate instantaneous field polarity. Cascaded electrodes are sited in nonopposed, noninterleaved relation on opposite sides of a long electrode partially overlapping the waveguide.

36 Claims, 2 Drawing Sheets

OPTICAL WAVEGUIDE DEVICE FOR FREQUENCY SHIFTING AND MODE CONVERSION

This invention relates to an optical waveguide device and relates in particular to an optical waveguide device usable as a frequency shifter.

BACKGROUND OF THE INVENTION

Optical waveguide devices have various applications. Devices that function as frequency shifters have many applications. Such devices can be used in laser heterodyne systems, in phase nulling fiber optic gyroscopes, etcetera.

Most applications for frequency shifters employ acousto-optic (Bragg) frequency-shifters that require high power, and are range limited to frequencies, greater than a few megahertz, that satisfy the Bragg condition. Recent applications involving acousto-optic phenomenon either replace the Bragg acoustic wave with a travelling, electro-optically-induced index grating, to allow Bragg diffraction, at a fixed angle, down to arbitrarily low frequencies, or achieve frequency shifting by Bragg scattering from a collinear electro-optically induced traveling wave of off-diagonal polarizability, which couples TE and TM waveguide modes. An input optical wave couples to an orthogonally polarized wave at a different frequency. The wave velocity can be electrically adjusted; hence, the frequency shift is tunable. Optical bandwidth is related to the birefringence, $N_e - N_o$, of the waveguide material, and to overall device length. Optical bandwidth of ten (10) Angstroms, attainable in devices made of lithium niobate having a birefringence $N_e - N_o = 0.09$, is too narrow for application in closed-loop phase nuling fiber optic gyroscopes, since superluminescent diode light sources of 100–150 Angstrom bandwidth are used. Obviously, broadband waveguide frequency shifters are required for such applications.

OBJECTS OF THE INVENTION

An object of the invention is to provide an optical waveguide device usable as a broadband frequency shifter.

Another object of the invention is to provide a broadband frequency shifter using a unique electrode scheme and using lithium tantalate (LiTaO$_3$) waveguide material.

Another object of the invention is to provide a broadband frequency shifter utilizing a collinear, electro-optically induced traveling wave of off-diagonal polarizability coupling transverse (TE and TM) waveguide modes.

Another object of the invention is to provide a broadband frequency shifter utilizing a collinear, electro-optically induced traveling wave of off-diagonal polarizability coupling transverse (TE and TM) waveguide modes.

Still another object of the invention is to provide an optical waveguide device having contact electrodes arranged into a particular pattern.

Still another object of the invention is to provide an optical waveguide device having utility not only as a broadband frequency shifter but also as a polarization rotator.

SUMMARY OF THE INVENTION

The above and other objects of the invention are fulfilled by optical waveguide devices having cascaded electrodes alongside a long electrode parallel to a long waveguide region in a lithium tantalate (LiTaO$_3$) crystal. A series of separate electrode segments electrically connected in series can be used in lieu of the long electrode and is considered to be its' functional equivalent. A.C. voltages impressed between the long electrode and cascaded electrodes cause the device to function as a broadband frequency shifter. If instead, a D.C. voltage is applied between the long electrode and selected cascaded electrodes this will cause the device to function as a TE$\rightleftarrows$TM wave mode converter. Use of the devices as shifters or as converters is within the invention's ambit.

DETAILED DESCRIPTION OF VARIOUS EMBODIMENTS OF THE INVENTION

Figure 1:
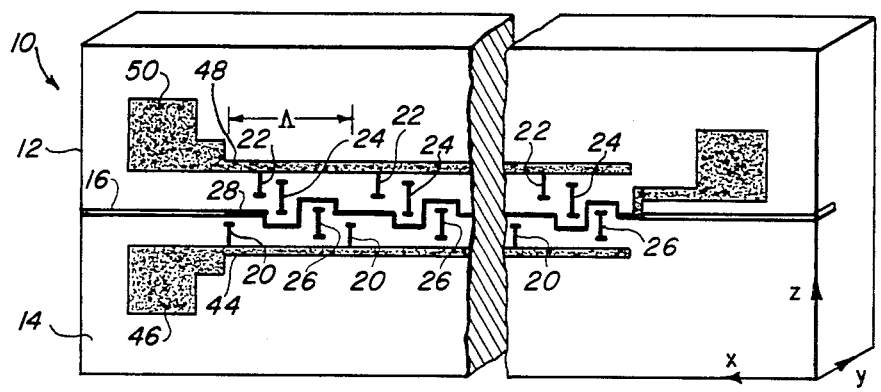
FIG. 1 is a stylized plan view of an optical waveguide device with a unique electrode scheme. A middle section of the device has been cut away so that first, second, and last stages of electrode groups are shown.
Figure 2:
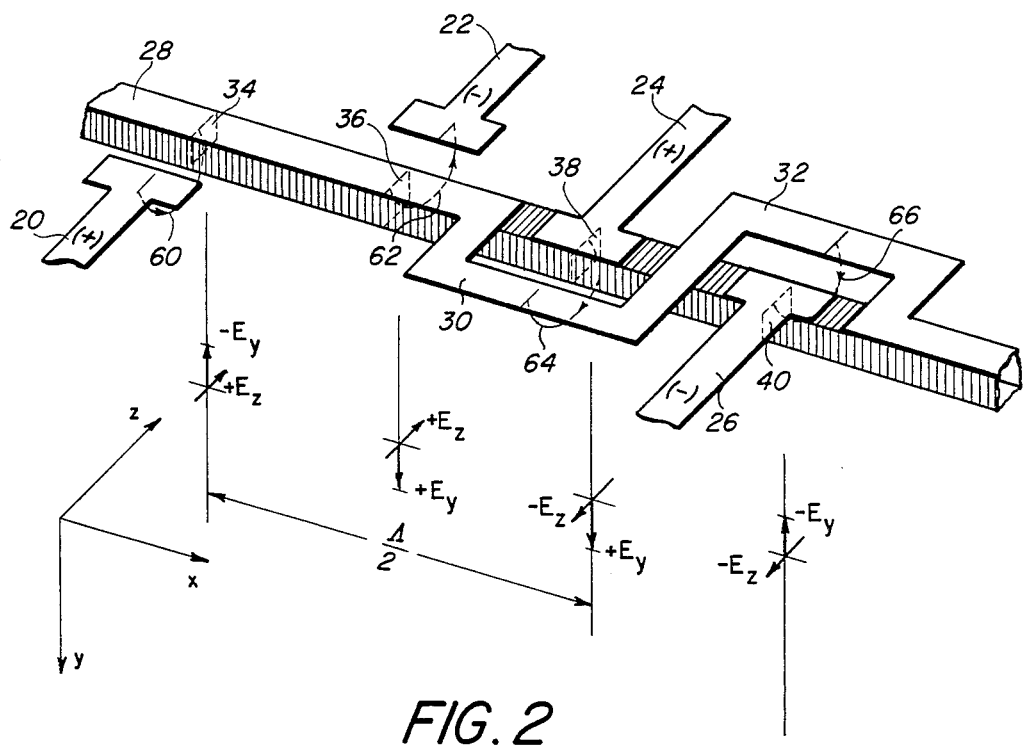
FIG. 2 is a diagram of pertinent features of the FIG. 1 device.
Figure 3:
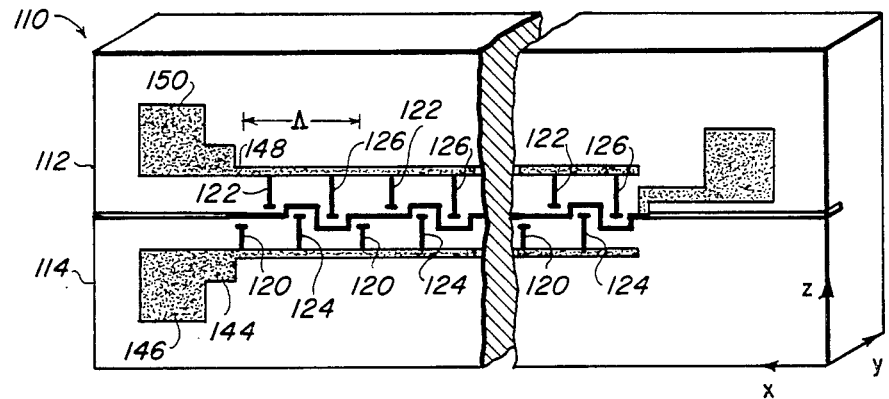
FIG. 3 is a stylized plan view of another optical waveguide device with another unique electrode scheme. A middle section of the device has been cut away so that first, second, and last steps of electrode groups are shown.
Figure 4:
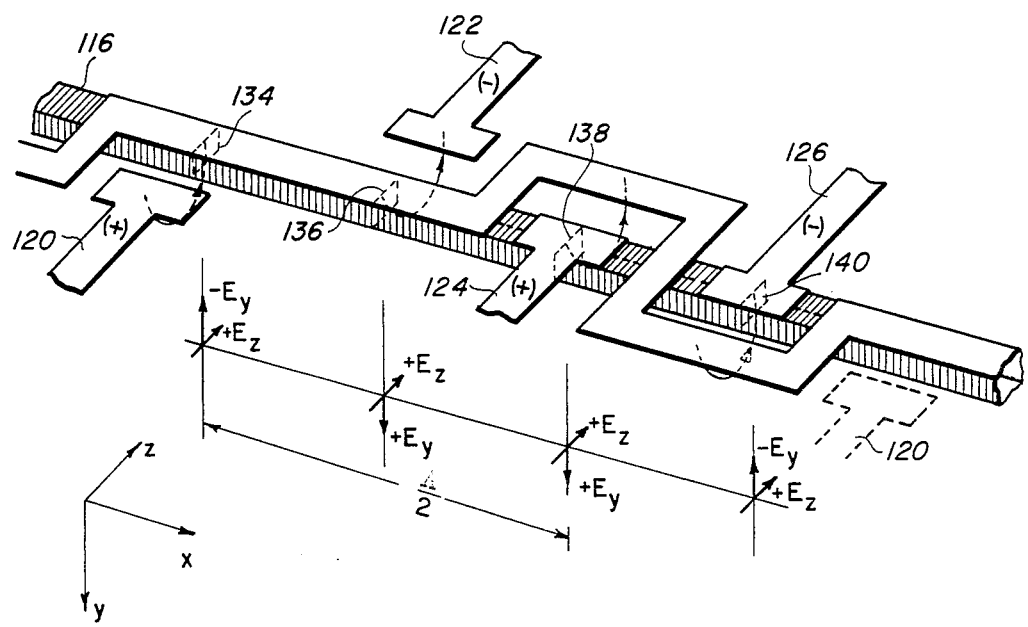
FIG. 4 is a diagram of pertinent features of the FIG. 3 device.

A preferred embodiment of the invention is illustrated in FIGS. 1 and 2 drawn to reveal salient features of a waveguide structure particularly useful as a frequency shifter. Another embodiment of the invention is illustrated in FIGS. 3 and 4 likewise drawn to reveal salient features of another waveguide structure useful as a frequency shifter. Both embodiments involve unique electrode geometry relative to a waveguide of selected birefringent material.

An optical waveguide device 10 illustrated in FIG. 1 comprises a birefringent crystal 12 of lithium tantalate (LiTaO$_3$) with an electroded surface 14 and a waveguide 16 below surface 14. Crystal orientation relative to orthogonal x, y and z directions is indicated in FIG. 1 wherein crystal thickness is measured in the ±y direction, waveguide length is measured in the ±x direction, and waveguide width is measured in the ±z direction. Waveguide 16 is a long, narrow channel region of known depth formed in crystal 12 designed to conduct optical waves in the crystal x direction. Waveguide 16 lies beneath a thin layer (not shown) of dielectric film material of uniform thickness deposited on crystal 12 before contact electrodes are formed on the thin, dielectric layer. Such layer provides vertical separation between the contact electrodes and waveguide 16. Such electrodes do not contact the crystal itself which usually has a dielectric constant lower than the deposited dielectric film material.

An electrode pattern formed on the dielectric film material overlaid on crystal 12 is illustrated in FIGS. 1 and 2. The pattern delineates a multiplicity of first electrodes 20, a multiplicity of second electrodes 22, a multiplicity of third electrodes 24, a multiplicity of fourth electrodes 26, and a long electrode 28 having a multiplicity of lateral offsets 30 and a multiplicity of lateral offsets 32 that are oppositely oriented with respect to offsets 30. Each and every one of electrodes 20–26 has a transversely oriented rib joined to a wide end portion laterally separated from long electrode 28 by a lateral gap of predetermined distance. The wide end portions of electrodes 20–26 are linked via electric fields to electrode 28 during device operation, hence they are conveniently called link electrodes, a name which suggests, as is the case, that electrodes 20–26 combine in chain fashion to perform a particular function, in this case, cumulative perturbation of a wave, or waves, in a waveguide.

The electrode pattern is a repetitive one in which groups of four electrodes 20–26 together with four corresponding segments of long electrode 28 form cascaded electrode stages laid over waveguide 16 upon the dielectric film material coating crystal 12. Each stage spans a fixed distance, in the range of 100–200 microns. Each device typically includes at least ten (10) such stages although FIG. 1 shows only first, second and last stages of a device.

Electrodes 20 and 26 are sited to the right of long electrode 28, and electrodes 22 and 24 are sited to the left of long electrode 28 when observed from a line-of-sight along the crystal +x direction.

Electrode 20 ends in an innermost stub located near a waveguide region 34 of area comparable to the stub and represented in FIGS. 1 and 2 by a vertical window suggesting, as is the case, that a wave propagated through waveguide 16, necessarily passes through region 34. Electrode 22 ends in an innermost stub located near a waveguide region 36, represented by a window. Electrodes 20 and 22 lie on opposite sides of long electrode 30 in nonopposed relation to one another. Electrode 24 ends in an innermost stub located above a waveguide region 38, represented by a window. Electrode 26 ends in an innermost stub located above a waveguide region 40, represented by a window. Electrodes 24 and 26 lie on opposite sides of long electrode 28 in nonopposed relation with electrode 24 skirted counterclockwise by electrode segment 30 and with electrode 26 skirted clockwise by electrode segment 32 when observed from the perspective of a wave propagating through waveguide 16 to pass through waveguide regions 34, 36, 38 and 40 in succession.

All of the electrodes 20 connect to a running lead 44 interconnected to a contact pad 46. Likewise, all of the electrodes 22 connect to a running lead 48 interconnected to a contact pad 50. All of the electrodes 24 include a distal end near lead 48. Jumper wires (not shown) may be used to interconnect such ends to contact pad 46 in order to enable electrodes 20 and 24 to be connected to a common bias voltage of positive (+) instantaneous polarity. All of the electrodes 26 include a distal end near lead 44. Jumper wires (not shown) may be used to interconnect such pads to contact pad 50 in order to enable electrodes 22 and 26 to be connected to a common bias voltage of negative (−) instantaneous polarity.

Bias conditions and corresponding electric field conditions existing in waveguide regions 34–40 during use of device 10 as a broadband frequency shifter are illustrated in FIG. 2 wherein electrodes 20–26 are positively (+) or negatively (−) biased at a particular moment as a result of applying an A.C. voltage $V_1 = V_o \sin \Omega t$ to contact pad 46 and another A.C. voltage $V_2 = V_o \cos \Omega t$ to contact pad 50 and grounding long electrode 28.

Waveguide regions 34–40 sustain transversely-oriented electric fields laterally coupled into them as bias voltages are applied to electrodes 20–26. Electric fields represented by curved arrows 60, 62, 64, and 66 have instantaneous polarity, at a particular moment, indicated by arrow direction. Each field sweeps through crystal material, and dielectric film material, to define a so-called coupling center spanning a lateral gap between an electrode stub and an adjacent portion of long electrode 28. Each electric field has vertical and horizontal directional components indicated in FIG. 2 as −Ey, +Ez for electrode 20; as +Ey, +Ez for electrode 22; as +Ey, −Ez for electrode 24; and as −Ey, −Ez for electrode 26. Field component orientation at waveguide regions 34–40 satisfy a requirement that each electrode stage host four vertical fields including two upward fields −Ey and two downward fields +Ey. Field component orientation at waveguide regions 34–40 also satisfy a requirement that each electrode stage host four horizontal fields including two leftward (−Ez) and two rightward (+Ez) fields. In the embodiment of the invention shown in FIGS. 1 and 2 the latter condition met by four successive fields +Ez, +Ez, −Ez and −Ez make for efficient, high power device operation unattainable with the second embodiment of the invention shown in FIGS. 3 and 4.

An optical waveguide device 110, illustrated in FIG. 3, comprises a birefringent crystal 112 of lithium tantalate with an electroded surface 114 and a waveguide 116 below surface 114, quite similar to like elements in the FIG. 2 device. An electrode pattern formed on dielectric film material (not shown) overlaid on crystal 112 is illustrated in FIGS. 3 and 4. The pattern delineates successive stages of four electrodes 120, 122, 124, 126 and a long electrode 128 having lateral offsets 130 and 132 repeated in each stage. Waveguide regions 134, 136, 138 and 140 exist in waveguide 116.

All of the electrodes 120 and 124 connect to a running lead 144 interconnected to contact pad 146. Likewise, all of the electrodes 122 and 126 connect to a running lead 148 interconnected to a contact pad 150.

Bias conditions and corresponding electric field conditions existing in waveguide regions 134–140 during use of device 110 as a broadband frequency shifter are illustrated in FIG. 4 wherein electrodes 120–126 are positively (+) or negatively (−) biased at a particular moment as a result of applying an A.C. voltage $V_1 = V_o \sin \Omega t$ to contact pad 146 and another A.C. voltage $V_2 = V_o \sin \Omega t$ to contact pad 150, and grounding long electrode 128.

Electric fields 160, 162, 164 and 166 represented by curved arrows have −Ey, +Ey, +Ey and −Ey instantaneous polarity, at a particular moment, indicated by arrow direction. Each field has two transverse directional components indicated in FIG. 4 as −Ey, +Ez for electrode 120; as +Ey, +Ez for electrode 122 as +Ey, +Ez for electrode 124; and as −Ey, +Ez for electrode 126.

Field components at waveguide regions 134–140 satisfy a requirement that each electrode stage support four vertical fields including two upwardly directed fields −Ey and two vertically downwardly directed fields +Ey. Horizontal field +Ez at each of the waveguide regions 134–140 does not change polarity from region to region; accounting for device operation less efficient, from a frequency conversion standpoint, than the efficiency of the FIG. 2 device, considered to optimum embodiment of the invention.

The FIG. 4 device differs from the FIG. 2 device in that electrodes 124 and 126 approach waveguide regions 138 and 140 and combine with long electrode offset portions 130 and 132 in a reverse manner when such elements are compared with like elements of the FIG. 2 device.

EXAMPLE

A device structure illustrating LiTaO$_3$ orientation and electrode pattern relative to orthogonal x, y and z axes is shown in FIG. 3. Estimated birefringence of LiTaO$_3$ in a 3 micron wide waveguide is about 0.006. The phase match condition $$\frac{2\pi}{\lambda_o} |N_{TE} - N_{TM}| = \frac{2\pi}{\Lambda}$$

applies. A period $\Lambda$ of 106–124 microns for the electrooptically (e−o) induced wave is expected for a wavelength $\lambda_o = 0.675$ microns.

Y-cut LiTaO$_3$ with z direction transverse to the waveguide is used. TE(z) and TM(y) modes are coupled through the $r_{42}$ coefficient by the y directed (vertical) electric field. Four phase operation of the frequency shifter is attainable through use of four cascaded electrodes in every stage of the cascaded stages of the electrode pattern. With two of every four electrodes connected to the same voltage (+ or −) there are oppositely poled vertical electric fields in the associated waveguide zones due to the lateral offset of one of each two electrodes from the nearby waveguide region. In the instance of the FIG. 3 device, this is accomplished without requirement for additional voltages or electrode crossings. Voltages for polarization rotation (DC) or polarization rotation plus frequency shifting (AC) are applied to this electrode structure as explained earlier in this specification. Optical bandwidth in this structure is about $\lambda_o/2N$, where N is the number of periods of the electrode structure. With N in the range of 20–40 an optical bandwidth of $\geq 100$ angstroms is expected.

Device fabrication is as follows: Waveguides 3 microns wide are obtained by indiffusing 250 angstroms of titanium at 1200° C. into a LiTaO$_3$ crystal for 6 hours in dry oxygen (O$_2$) until a 2–3 micron deep waveguide region is formed. 2000 angstrom thick aluminum electrodes are delineated on top of a 1600 angstrom thick silicon dioxide (SiO$_2$) buffer layer formed on the substrate surface where the waveguides were formed. This SiO$_2$ layer is a dielectric film material not shown in FIGS. 1–5 yet present in both devices described with reference to FIGS. 1 and 3. Devices with a periodicity $\Lambda = 100$, 114, and 124 microns pe stage with the number of stages N=10, 20 and 40 are produced. They are tested as polarization mode converters by applying a D.C. voltage to cascaded electrodes on one side of the long electrode and grounding both the long electrode and the cascaded electrodes on the other side of the long electrode. With $\lambda_o = 0.633$ microns, $\Lambda = 124$ microns, and N=40; a maximum efficiency vs. temperature for the N=40 and N=20 devices is obtained.

A lithium tantalate (LiTaO$_3$) crystal is used, because its birefringence is much lower than lithium niobate. Any birefringent crystal comparable to or better than lithium tantalate can be used.

Device topography typically meets the following specification: a LiTaO$_3$ substrate; a 3 micron wide waveguide 1000–4960 microns long, 2 microns deep (250 angstroms deep before diffusion) electrode stubs 25 microns long and 5 microns wide, a long electrode 5 microns wide with 10 micron offsets; minimum spacing in the $\pm z$ direction of 10 microns between electrode offsets are skirted electrode stubs, N cascaded stages per device N=10, 20, 40...; stage length $\Lambda = 100$, 114, 124 ... microns.

Polarization mode conversion can be efficiently obtained with reasonable voltage levels and a large optical bandwidth using LiTaO$_3$, and has been demonstrated. This device, operated as a frequency shifter, has application to fiber optic gyroscopes.

Obviously many modifications and variations of the invention are possible in light of the above teachings. It is therefore to be understood that within the scope of the appended claims, the invention may be practical otherwise than as specifically described.

We claim:

1. Waveguide device structure comprising:
    an optical waveguide formed in an elongated region in a crystalline substrate of birefringent material;
    a set of first coupler electrodes disposed along one side of said waveguide at uniform intervals;
    a set of second coupler electrodes disposed along another side of said waveguide at uniform intervals;
    a set of third coupler electrodes disposed along said another side of said waveguide at uniform intervals;
    a set of fourth coupler electrodes disposed along said one side of said waveguide at uniform intervals;
    said coupler electrodes forming cascaded stages of four coupler electrodes per stage, first, second, third and fourth coupler electrodes in any stage being so arranged that said first and fourth electrodes are both disposed on said one side of said waveguide and said second and third electrodes are both disposed on said another side of said waveguide;
    said third coupler electrode being disposed over a third waveguide zone and said fourth coupler electrode being disposed over a fourth waveguide zone;
    said first coupler electrode being disposed over a substrate portion on said one side of said waveguide in laterally spaced relation to a first waveguide zone and said second coupler electrode being disposed over another substrate portion on said another side of said waveguide in laterally spaced relation to a second waveguide zone;
    a long electrode extending over a path paralleling said waveguide, said long electrode extending over said substrate to pass around said third and fourth coupling electrodes by winding alternately to each side of both sides of said waveguide, said long electrode passing by said first and second coupling electrodes;
    said first and third electrodes being interconnected;
    said second and fourth electrodes being interconnected.

2. A structure according to claim 1 wherein said birefringent material is lithium tantalate.

3. A structure according to claim 2 wherein said waveguide contains titanium indiffused into lithium tantalate.

4. A structure according to claim 1 wherein dielectric film material separates said electrodes from said waveguide.

5. A structure according to claim 4 wherein said dielectric film material is silicon dioxide.

6. A structure according to claim 1 wherein said coupler electrodes are longitudinally spaced center-to-center a distance of about 50 microns.

7. A structure according to claim 1 wherein said coupler electrodes each are about 25 microns long and about 5 microns wide.

8. A structure according to claim 1 wherein said long electrode is at least 1000 microns long and is about 5 microns wide.

9. A structure according to claim 1 wherein said long electrode is wider than said waveguide.

10. A structure according to claim 1 wherein said waveguide is about 3 microns wide.

11. A structure according to claim 1 wherein coupler electrode to long electrode spacing is about 5 microns in a lateral direction.

12. A structure according to claim 1 wherein coupler electrode to long electrode spacing is about 10 microns in a longitudinal direction in the case of said first and second coupler electrodes.

13. A structure according to claim 1 wherein said long electrode winds to said one side of said waveguide to pass around said third coupler electrode and winds to said another side of said waveguide to pass around said fourth coupler electrode.

14. A structure according to claim 1 wherein said electrodes are aluminum electrodes.

15. Waveguide device structure comprising:
an optical waveguide formed in an elongated region in a crystalline substrate of birefringent material;
a set of first coupler electrodes disposed along one side of said waveguide at uniform intervals;
a set of second coupler electrodes disposed along another side of said waveguide at uniform intervals;
a set of third coupler electrodes disposed along said one side of said waveguide at uniform intervals;
a set of fourth coupler electrodes disposed along another side of said waveguide at uniform intervals;
said coupler electrodes forming cascaded stages of four coupler electrodes per stage, first, second, third and fourth coupler electrodes in any stage being so arranged that said first and third electrodes are both disposed on said one side of said waveguide and said second and fourth electrodes are both disposed on said other side of said waveguide;
said third coupler electrode being disposed over a third waveguide zone and said fourth coupler electrode being disposed over a fourth waveguide zone;
said first coupler electrode being disposed over a substrate portion on said one side of said waveguide in laterally spaced relation to a first waveguide zone and said second coupler electrode being disposed over another substrate portion on said another side of said waveguide in laterally spaced relation to a second waveguide zone;
a long electrode extending over a path paralleling said waveguide, said long electrode extending over said substrate to pass around said third and fourth coupling electrodes by winding alternately to each side of both sides of said waveguide, said long electrode passing by said first and second coupling electrodes;

said first and third electrodes being interconnected;
said second and fourth electrodes being interconnected.

16. A structure according to claim 15 wherein said birefringent material is lithium tantalate.

17. A structure according to claim 16 wherein said waveguide contains titanium indiffused into lithium tantalate.

18. A structure according to claim 15 wherein dielectric film material separates said electrodes from said waveguide.

19. A structure according to claim 18 wherein said dielectric film material is silicon dioxide.

20. A structure according to claim 15 wherein said coupler electrodes are longitudinally spaced center-to-center a distance of about 50 microns.

21. A structure according to claim 15 wherein said coupler electrodes each are about 25 microns long and about 5 microns wide.

22. A structure according to claim 15 wherein said long electrode is at least 1000 microns long and is about 5 microns wide.

23. A structure according to claim 15 wherein said long electrode is wider than said waveguide.

24. A structure according to claim 15 wherein said waveguide is about 3 microns wide.

25. A structure according to claim 15 wherein coupler electrode to long electrode spacing is about 5 microns in a lateral direction.

26. A structure according to claim 15 wherein coupler electrode to long electrode spacing is about 10 microns in a longitudinal direction in the case of said first and second coupler electrodes.

27. A structure according to claim 15 wherein said long electrode winds to said another side of said waveguide to pass around said third coupler electrode and winds to said one side of said waveguide to pass around said fourth coupler electrode.

28. A structure according to claim 15 wherein said electrodes are aluminum electrodes.

29. A frequency shifter comprising:
an optical waveguide formed in an elongated region in a crystalline substrate of birefringent material;
a set of first coupler electrodes disposed at uniform intervals $\Lambda$ along one side of said waveguide;
a set of second coupler electrodes disposed at uniform intervals $\Lambda$ along another side of said waveguide;
a set of third coupler electrodes disposed at uniform intervals $\Lambda$ along one side of said waveguide;
a set of fourth coupler electrodes disposed at uniform intervals $\Lambda$ along said another side of said waveguide;
said coupler electrodes forming cascaded stages of four coupler electrodes per stage including first, second, third and fourth electrodes so arranged that said first and fourth coupler electrodes are both disposed on said one side of said waveguide and said second and third electrodes are both disposed on said another side of said waveguide;
said third coupler electrode being disposed over a third waveguide zone, said fourth coupler electrode being disposed over a fourth waveguide zone;
said first coupler electrode being disposed over a substrate portion on said one side of said waveguide in laterally spaced relation to a first waveguide zone, said second coupler electrode being disposed over another substrate portion on said another side of said waveguide in laterally spaced relation to a second waveguide zone;

a long electrode laid parallel to said waveguide, said long electrode running over said substrate portion to pass around said third coupling electrode and running over said another substrate portion to pass around said fourth coupling electrode, said long electrode winding alternately to both sides of said waveguide, said long electrode running over said waveguide past said first and second coupling electrodes;

said first and third electrodes being interconnected;

said second and fourth electrodes being interconnected; and a first voltage $V_1$ applied to said first and third electrodes and a second voltage $V_2$ applied to said second and fourth electrodes.

30. A structure according to claim 29 wherein said electrodes are aluminum electrodes, said coupler electrodes are about 25 microns wide, said long electrode is at least 1000 microns long and is about 5 microns wide, said waveguide is about 3–4 microns wide, said coupler electrodes are each laterally spaced from said long electrode a distance of about 5 microns, and said third and fourth coupler electrodes are longitudinally spaced from offset portions of said long electrode a distance of about 10 microns.

31. A frequency shifter according to claim 29 wherein said first voltage is $V_1 = V_o \cos \Omega t$ and said second voltage is $V_2 = V_o \cos \Omega t$.

32. A frequency shifter comprising:
an optical waveguide formed in an elongated region in a crystalline substrate of birefringent material;
a set of first coupler electrodes disposed at uniform intervals $\Lambda$ along one side of said waveguide;
a set of second coupler electrodes disposed at uniform intervals $\Lambda$ along another side of said waveguide;
a set of third coupler electrodes disposed at uniform intervals $\Lambda$ along one side of said waveguide;
a set of fourth coupler electrodes disposed at uniform intervals $\Lambda$ along said another side of said waveguide;
said coupler electrodes forming cascaded stages of four coupler electrodes per stage including first, second, third and fourth electrodes so arranged that said first and third coupler electrodes are both disposed on one said one side of said waveguide and said second and fourth electrodes are both disposed on said another side of said waveguide;
said third coupler electrode being disposed over a third waveguide zone, said fourth coupler electrode being disposed over a fourth waveguide zone;
said first coupler electrode being disposed over a substrate portion on said one side of said waveguide in laterally spaced relation to a first waveguide zone, said second coupler electrode being disposed over another substrate portion on said another side of said waveguide in laterally spaced relation to a second waveguide zone;
a long electrode laid parallel to said waveguide, said long electrode running over said another side of said waveguide to pass around said third coupling electrode and running over said one side of said waveguide to pass around said fourth coupling electrode, said long electrode winding alternately to both sides of said waveguide, said long electrode running over said waveguide past said first and second coupling electrodes;

said first and third electrodes being interconnected;

said second and fourth electrodes being interconnected; and a first voltage $V_1$ applied to said first and third electrodes and a second voltage $V_2$ applied to said second and fourth electrodes.

33. A structure according to claim 32 wherein said electrodes are aluminum electrodes, said coupler electrodes are about 25 microns wide, said long electrode is at least 1000 microns long and is about 5 microns wide, said waveguide is about 3–4 microns wide, said coupler electrodes are each laterally spaced from said long electrode a distance of about 5 microns, and said third and fourth coupler electrodes are longitudinally spaced from offset portions of said long electrode a distance of about 10 microns.

34. A frequency shifter according to claim 32 wherein said first voltage is $V_1 = -V_o \cos \Omega t$ and said second voltage is $V_2 = V_o \cos \Omega t$.

35. A tunable mode converter comprising:
an optical waveguide formed in an elongated region in a crystalline substrate of birefringent material;
a set of first coupler electrodes disposed along one side of said waveguide at uniform intervals $\Lambda$ along one side of said waveguide;
a set of second coupler electrodes disposed at uniform intervals $\Lambda$ along another side of said waveguide;
a set of third coupler electrodes disposed at uniform intervals $\Lambda$ along said another side of said waveguide;
a set of fourth coupler electrodes disposed at uniform intervals along said one side of said waveguide;
said coupler electrodes forming cascaded stages of four coupler electrodes per stage;
first, second, third, and fourth coupler electrodes of each stage being disposed alongside said waveguide with said first and fourth coupler electrodes disposed on said one side and with said second and third coupler electrodes disposed on said another side of said waveguide, uniform spacing between successive coupler electrodes determining wavelength at which mode conversion occurs;
said third coupler electrode overlying a first waveguide zone, said fourth coupler electrode overlying a second waveguide zone, said first coupler electrode being disposed at said one side of said waveguide near a first waveguide zone spaced a slight distance from said first coupler electrode, and said second coupler electrode being disposed at said another side of said waveguide near a second waveguide zone spaced a slight distance from said second coupler electrode;
a long electrode extending along said waveguide around said third and fourth waveguide zones and over said first and second waveguide zones to pass around said third and fourth coupler electrodes, to pass by said first coupler electrode overlying said first waveguide zone, and to pass by said second coupler electrode overlying said second waveguide zone, said long electrode winding to said one side of said waveguide near said third coupler electrode, winding to said another side of said waveguide near said fourth coupler electrode, and running parallel to said waveguide near said first and second coupling electrodes;

said first and third electrodes being interconnected;

said second and fourth electrodes being interconnected; and a D.C. voltage impressed between said long electrode and (1) said first and third electrodes or (2) said second and fourth electrodes for inducing TE$\rightleftarrows$TM mode conversion within said waveguide.

36. A tunable mode converter comprising:

an optical waveguide formed in an elongated region in a crystalline substrate of birefringent material;

a set of first coupler electrodes disposed along one side of said waveguide at uniform intervals $\Lambda$ along one side of said waveguide;

a set of second coupler electrodes disposed at uniform intervals $\Lambda$ along another side of said waveguide;

a set of third coupler electrodes disposed at uniform intervals $\Lambda$ along said one side of said waveguide;

a set of fourth coupler electrodes disposed at uniform intervals $\Lambda$ along said another side of said waveguide;

said coupler electrodes forming cascaded stages of four coupler electrodes per stage;

first, second, third, and fourth coupler electrodes of each stage being disposed alongside said waveguide with said first and third coupler electrodes disposed on said one side and with said second and fourth coupler electrodes disposed on said another side of said waveguide, uniform spacing between successive coupler electrodes determining wavelength at which mode conversion occurs;

said third coupler electrode overlying a third waveguide zone, said fourth coupler electrode overlying a fourth waveguide zone, said first coupler electrode being disposed at said one side of said waveguide near a first waveguide zone spaced a slight distance from said first coupler electrode, said second coupler electrode being disposed at said another side of said waveguide near a second waveguide zone spaced a slight distance from said second coupler electrode;

a long electrode extending along said waveguide around said third and fourth waveguide zones and over said first and second waveguide zones to pass around said third and fourth coupler electrodes, to pass by said first coupler electrode overlying said first waveguide zone, and to pass by said second coupler electrode overlying said second waveguide zone, said long electrode winding to said another side of said waveguide near said third coupler electrode, winding to said one side of said waveguide near said fourth coupler electrode, and running parallel to said waveguide near said first and second coupling electrodes;

said first and third electrodes being interconnected;

said second and fourth electrodes being interconnected; and a D.C. voltage impressed between said long electrode and (1) said first and third electrodes or (2) said second and fourth electrodes for inducing TE$\rightleftarrows$TM mode conversion within said waveguide.

* * * * *